Jan. 25, 1927.  1,615,438
W. P. BOTT
STORE FURNITURE
Filed Sept. 30, 1925    2 Sheets-Sheet 1
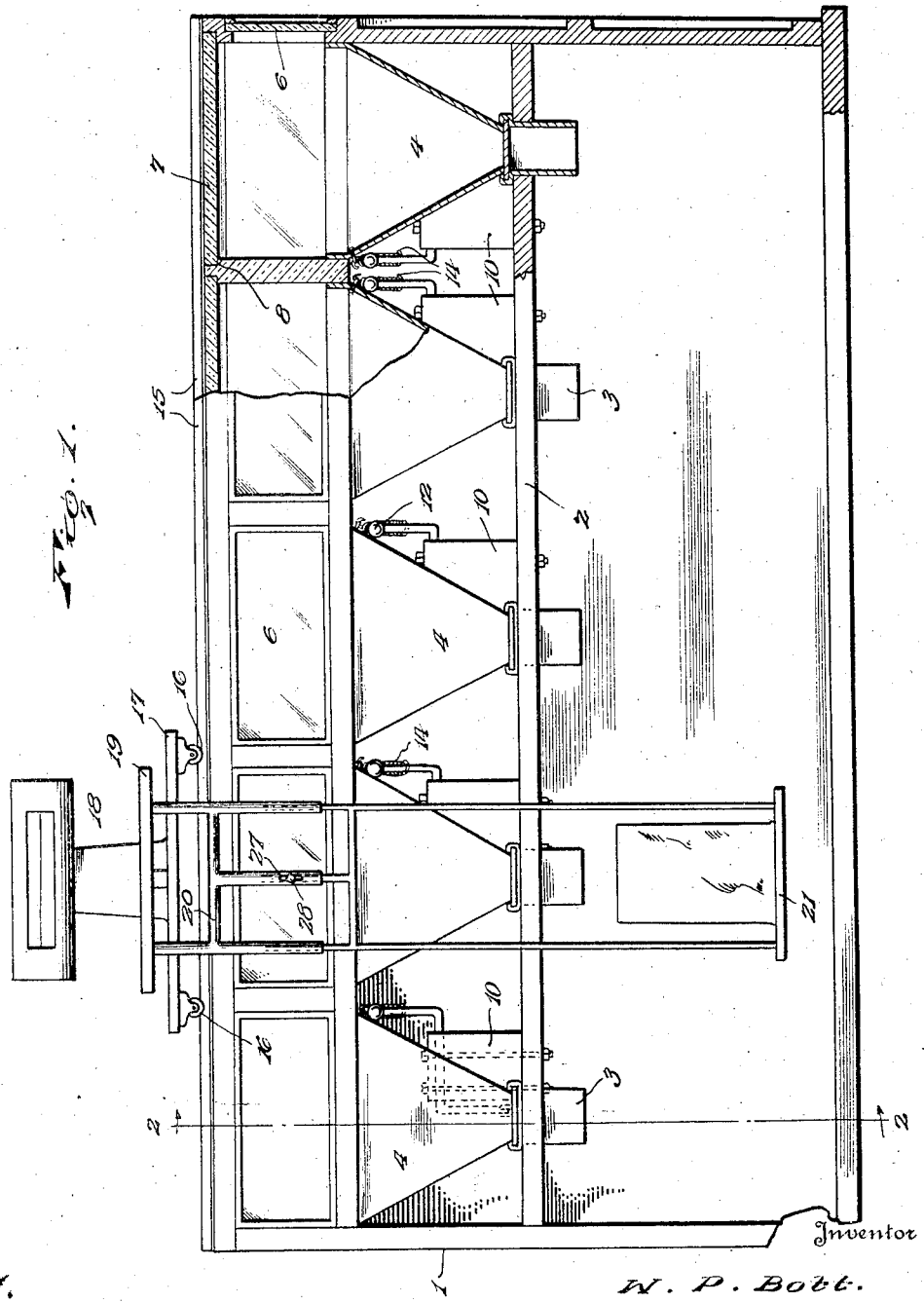
Inventor
W. P. Bott.
By
Lacey & Lacey, Attorneys Jan. 25, 1927.  
W. P. BOTT  
STORE FURNITURE  
Filed Sept. 30, 1925    2 Sheets-Sheet 2  
1,615,438
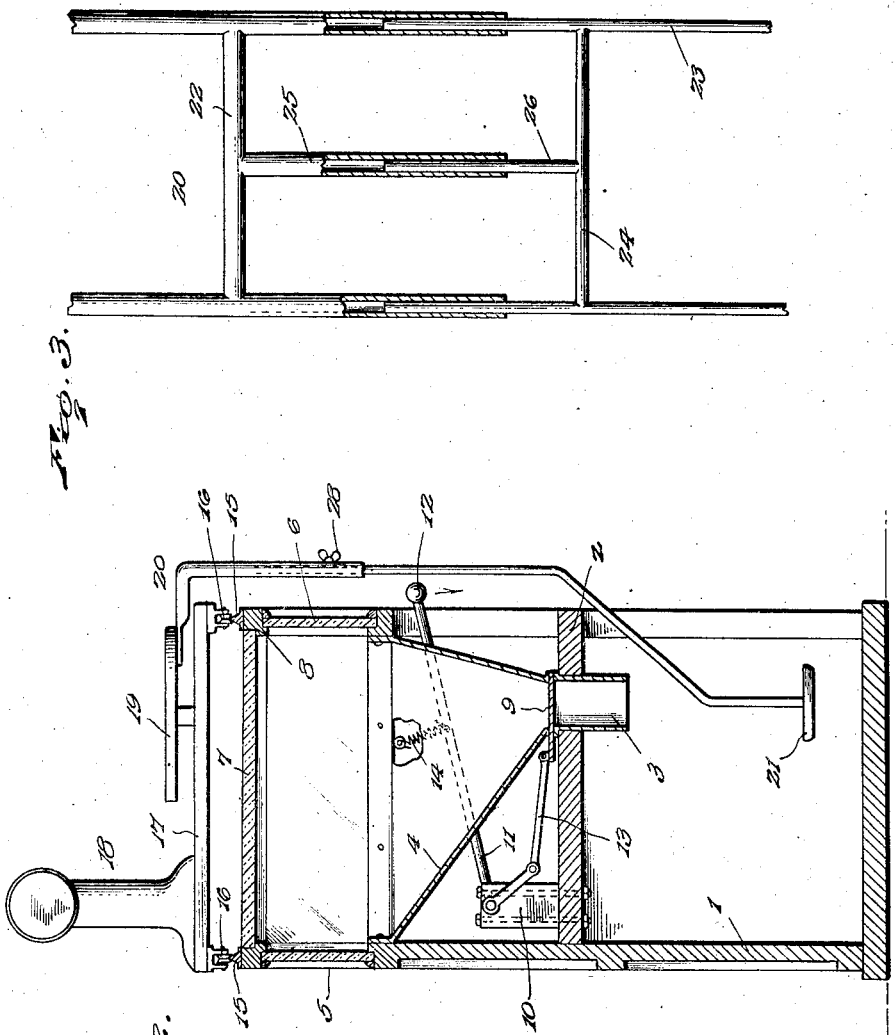
Inventor
W. P. Bott.
By
Lacey & Lacey, Attorneys Patented Jan. 25, 1927.

1,615,438

UNITED STATES PATENT OFFICE.

WISTER P. BOTT, OF HOMER, LOUISIANA, ASSIGNOR OF ONE-HALF TO DANIEL W. KNIGHTON AND ONE-FOURTH TO FRED C. McCLANAHAN, BOTH OF HOMER, LOUISIANA.

STORE FURNITURE.

Application filed September 30, 1925. Serial No. 59,657.

This invention has for its object the provision of a novel form of store counter whereby customers may view commodities which are sold at retail by weight from stock in bulk and the stock maintained in a sanitary condition. A further object of the invention is to provide novel means whereby a weighing scale may be easily brought into cooperating relation to a bin and the desired weight of the commodity withdrawn from the bin without being handled directly by the salesman. Other objects of the invention will appear incidentally in the course of the following description, and the invention resides in certain novel features which will be particularly pointed out in the appended claim.

In the drawings:

Figure 1 is a rear elevation, partly broken away and in section, of store furniture embodying my present invention;

Fig. 2 is a vertical transverse section on the line 2—2 of Fig. 1, and

Fig. 3 is an enlarged detail sectional elevation of a portion of the apparatus.

The counter constructed in accordance with my invention may be of any preferred dimensions and embodies essentially a frame 1 which is open at its rear portion but enclosed at its front and ends whereby access of outsiders to the commodities will be prevented but the salesman may easily withdraw a desired quantity of any commodity at will. The frame includes a shelf or platform 2 which extends horizontally from end to end of the counter and has secured therein at intervals spouts 3 which constitute outlets for storage bins 4 constructed within the counter above the shelf, as clearly shown. The top and front and rear sides of the counter are formed in panels 5 which are glazed, as shown at 6, so that the contents of the several bins may be easily viewed. The front and rear panes of glass are preferably fixed in position but the top panes 7 are preferably removably supported over the respective bins by resting on shoulders 8 formed in the frame of the counter and in glass partitions between the tops of the bins, as shown in Fig. 1. By removing any one of the panes 7, a bin may be refilled whenever necessary. The several bins 4 have downwardly converging walls, as clearly shown in the drawings, so that the contents of the bin will be directed positively into the outlet nozzle or spout 3 and, to control the outflow, a cut-off slide 9 is fitted across the spout at the bottom of the bin and normally extends across the same so as to cut off the flow, as will be understood upon reference to Fig. 2 of the drawings. In front of each bin a bearing post 10 is provided upon the shelf 2 and an angle lever 11 is fulcrumed in the said post. One arm of the lever extends rearwardly beyond the rear side of the counter and is equipped with a knob 12 or other convenient form of handle whereby it may be manipulated, and the lower arm of the lever extends downwardly and slightly rearwardly and is connected by a link 13 with the front end of the corresponding cut-off slide 9, as clearly shown. A spring 14 is attached to the upper arm of the lever and to a fixed part of the counter or the bin so that the lever will be normally held in its raised position and the cut off normally projected across the bottom of the bin.

Extending longitudinally upon the top of the counter and preferably at the front and rear sides thereof are rails 15 upon which are engaged rollers 16 mounted upon the bottom of the base 17 of a weighing scale, indicated generally at 18. The weighing scale may be of any approved form and is equipped with a scale pan 19 operating in the usual manner. According to my invention, a hanger frame 20 is secured to the under side of the scale pan 19 and this frame is so formed as to extend rearwardly from the scale pan and then downwardly to a point at or below the shelf 2 where it is extended inwardly and forwardly and then downwardly to carry a supplemental pan or platform 21 vertically below that spout 3 through which a commodity is to be drawn. As shown most clearly in Figs. 1 and 3, the hanger frame 20 comprises an upper member having tubular side bars connected by a brace 22 and a lower member having side bars 23 connected by a brace 24. A socket 25 extends from the brace 22 centrally of the same and a stem 26 rises centrally from the brace 24 to enter the said socket. The socket 25 is constructed with a longitudinal slot 27 in its front wall and a set screw 28 is fitted through the said socket and carried by the stem 26 so that the stem may be secured in any desired position within the limits of the slot 27, thereby adjusting the pan or scale platform 21 vertically to accommodate a larger or smaller bag or other container and bring the mouth of the container close to the respective spout 3 to avoid loss of the commodity through spreading flow of the same which will carry it over the sides of the bag or other container.

It will be readily noted that the rear of the counter below the shelf 2 is open from end to end thereof. Consequently, the scale 18 may be shifted freely from end to end of the counter so that the platform 21 suspended therefrom by the hanger frame 20 may be brought into position below that bin which contains the commodity, a sale of which is to be made. Having brought the pan 21 below the proper spout 3 and adjusted the hanger frame so that the bag or other container will be close to the spout, the salesman presses downwardly upon the handle 12 of the angle lever 11 and thereby withdraws the cut off 9 from across the spout, whereupon the commodity within the bin 4 will at once flow into the bag upon the scale pan 21. The salesman, of course, will merely watch the pointer of the scale 18 while depresing the lever 11 and as soon as the scale shows that the desired weight of the commodity has entered the bag upon the scale pan 21, he releases the lever and the spring 14 at once retracts the same and cuts off the flow. Ordinarily, the quantity of the commodity which is still within the spout 3 when the desired quantity is indicated by the scale 18 is so slight as to be of no moment and may be disregarded, but the salesman through continued use of the apparatus will soon become so expert in reading the scale that the release of the lever will be unconsciously or automatically effected so that the amount of the commodity withdrawn will be neither more nor less than the amount for which the customer pays.

It will be readily seen from the foregoing description, taken in connection with the accompanying drawings, that I have provided a very simple apparatus whereby various commodities which are retailed from bulk stock may be arranged in a convenient and compact manner and a weighing scale readily shifted from point to point so as to weigh any desired quantity of any desired commodity and that the handling of the commodity is minimized. The counter constitutes an attractive piece of store furniture and permits the customers as well as the salesman to view the different commodities and note the condition of the same without actually handling them so that the commodities will be maintained in a sanitary condition.

Having thus described the invention, I claim:

Store furniture comprising a counter, a plurality of storage bins housed within the counter, a weighing scale mounted upon the top of the counter and shiftable along the same to be brought over a selected bin, and means carried by the scale for supporting a container below the bin.

In testimony whereof I affix my signature.

WISTER P. BOTT. [L. S.]